United States Patent Office 3,311,628
Patented Mar. 28, 1967

3,311,628
DERIVATIVES OF PYRROLO [2,3-d] PYRIMIDINE
Richard A. Partyka, Liverpool, N.Y., assignor to Bristol-Myers Company, New York, N.Y., a corporation of Delaware
No Drawing. Filed Mar. 9, 1965, Ser. No. 438,409
15 Claims. (Cl. 260—256.4)

This invention relates to novel analgesic, antipyretic, hypotensive and anti-inflammatory agents. More particularly, this invention relates to certain 2,7-di-substituted-pyrrolo[2,3-d]pyrimidines which may bear additional substituents in the 4 and/or 6 positions.

It is an object of this invention to provide a new class of therapeutic compounds. It is another object of this invention to provide novel compounds which are valuable analgesic, antipyretic and anti-inflammatory agents.

These objects have been attained by the practice of this invention, which, briefly, comprises providing a member selected from the group consisting of compounds of the formula

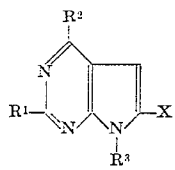

wherein X is a member selected from the group consisting of chloro and bromo, $R^1$ is a member selected from the group consisting of (lower)alkyl, (lower)alkylthio and —Ar in which —Ar is a member selected from the group consisting of radicals of the formula

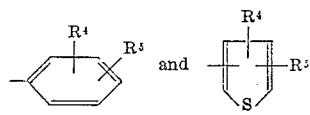

in which $R^4$ and $R^5$ are each members selected from the group consisting of hydrogen, chloro, bromo, (lower)alkyl, (lower)alkoxy and trifluoromethyl, $R^2$ is a member selected from the group consisting of hydrogen, (lower)alkyl and —Ar, and $R^3$ is a member selected from the group consisting of (lower)alkyl, (lower)cycloalkyl containing from 3 to 8 carbon atoms inclusive, (lower)alkenyl, (lower)alkynyl, di(lower)alkylamino(lower)alkyl, piperidino(lower)alkyl, morpholino(lower)alkyl, N'-(lower)alkylpiperazino(lower)alkyl, —Ar and —(CH$_2$)$_n$—Ar wherein $n$ is an integer from one to three inclusive; and the nontoxic, pharmaceutically acceptable acid addition salts thereof.

The new compounds are basic and are used per se as the base, especially when it is a crystalline solid at room temperature, and also in the form of addition salts of organic and inorganic acids such as hydrochloric, hydrobromic, hydriodic, sulfuric, nitric, phosphoric, acetic, benzoic, ascorbic, citric, maleic, malic, tartaric, succinic, sulfamic, glycolic, cinnamic and mandelic acids. These salts are prepared by treating the free base with one or two equivalents of acid and are then isolated if desired, e.g. by lyophilization. The use of a salt is sometimes preferred to increase the aqueous solubility of the compound.

In the preferred embodiments of the present invention, which are particularly active as analgesic, antipyretic and anti-inflammatory agents, $R^1$ is (lower)alkylthio, $R^2$ is (lower)alkyl or, preferably, hydrogen, $R^3$ is (lower)alkyl or, preferably, methyl and X is chloro.

The compounds of the present invention were tested for analgesic activity by the phenylquinone test of Sigmund et al., Proc. Soc. Expt'l. Biol. and Med., 95, 729 (1957) in which an analgesic reduces the induced writhing of the mice. With the test agent given 50 minutes before injection of the phenyl-p-quinone, the reduction in induced writhing at the end of the first hour was found for aspirin to be 65% at 150 mgm./kg. p.o., for 2-ethylthio-6-chloro - 7 - methylpyrrolo[2,3-d]pyrimidine (Ex. 10c) to be about 42–77% at 150 mgm./kg. p.o., about 44–58% at 75 mgm./kg. p.o. and about 61–77% at 50 mgm./kg. p.o., for 2-ethylthio-6-chloro-4,7-dimethylpyrrolo[2,3-d]pyrimidine hydrochloride (Ex. 13c) to be about 86% at 75 mgm./kg. p.o. and about 56% at 50 mgm./kg. p.o., for 2-methylthio-6-chloro-7-methyl-pyrrolo[2,3-d]pyrimidine hydrochloride (Ex. 11b) to be about 61–83% at 150 mgm./kg. p.o. and about 33–58% at 75 mgm./kg. p.o. and about 61% at 50 mgm./kg. p.o. in one test and for 2-methylthio-6-chloro-4,7-dimethyl-pyrrolo[2,3-d]pyrimidine (Ex. 7b) to be about 61% at 150 mgm./kg. p.o.

The term "(lower)alkyl" as used herein means both straight and branched chain, monovalent, aliphatic hydrocarbon radicals having from 1 to 6 carbon atoms inclusive, such as methyl, ethyl, propyl, isopropyl, isobutyl, t-butyl, hexyl, etc.

The compounds of the present invention are prepared by heating a compound of the formula

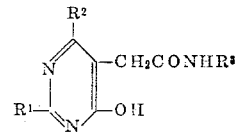

wherein $R^1$ is (lower)alkyl, (lower)alkylthio or —Ar in which Ar is a radical of the formula

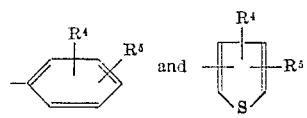

in which $R^4$ and $R^5$ are each hydrogen, chloro, bromo, (lower)alkyl, (lower)alkoxy or trifluoromethyl, $R^2$ is hydrogen, (lower)alkyl or —Ar, and $R^3$ is (lower)alkyl, (lower)cycloalkyl containing from 3 to 8 carbon atoms inclusive as exemplified by cyclopropyl, cyclobutyl, cycloheptyl and cyclooctyl, (lower)alkenyl including allyl and methallyl, (lower)alkynyl incuding propargyl, di(lower)alkylamino(lower)alkyl, piperidino(lower)alkyl, morpholino(lower)alkyl, N'-(lower)alkylpiperazino (lower)alkyl, —Ar or —(CH$_2$)$_n$—Ar wherein $n$ is an integer from one to three inclusive, or an acid addition salt thereof with phosphorus oxychloride or phosphorus oxybromide to form pyrrolo[2,3-d]pyrimidines having the formula

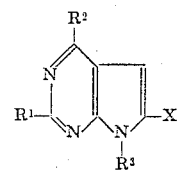

wherein $R^1$, $R^2$ and $R^3$ are the same as described above and X represents chloro or bromo or, after catalytic dehalogenation, hydrogen. These substituted pyrrolo[2,3-d]pyrimidines exhibit hypotensive or analgesic and antipyretic activity.

The above-described pyrimidineacetamides used in the cyclization reaction are prepared by reacting a compound having the formula

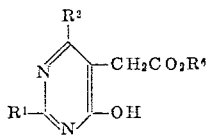

wherein $R^1$ and $R^2$ are the same as described above, and $R^6$ is hydrogen or (lower)alkyl with an amine having the formula $R^3NH_2$. This reaction is accomplished by first preparing the mixed anhydride of the above acid (when $R^6$ is hydrogen) by reacting the acid with equimolar amounts of triethylamine and ethylchloroformate or isobutyl chloroformate in acetonitrile, and subsequently reacting the mixed anhydride with the amine, preferably under a nitrogen atmosphere. Alternatively, the reaction is accomplished by the direct reaction of an alkyl ester of the above acid with the amine. The crude product is purified by recrystallization, if it is a solid, or by distillation, if it is a liquid, according to conventional techniques.

The reactants, i.e. the substituted-4-hydroxypyrimidine-5-acetic acids and their esters, from which the compounds of this invention may be prepared are either commercially available or are known compounds or are readily synthesized as illustrated below or by methods known in the art as illustrated schematically thus:

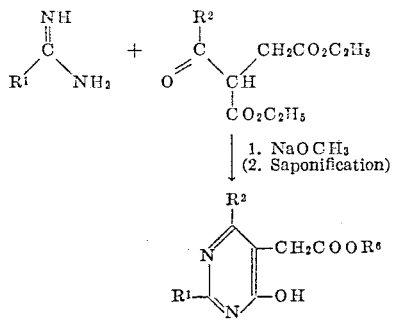

wherein $R^1$, $R^2$ and $R^6$ have the meaning set forth above and, in addition, $R^1$ may be a sulfhydryl (—SH) group which is converted (after cyclization to the pyrimidine), to an alkylthio (—SR) group by customary procedures such as reaction of the ester or final amide with sodium methoxide and an alkyl halide such as methyl iodide.

Thus, for example, ethyl 2-methyl-4-hydroxypyrimidine-5-acetate may be prepared according to the procedure described by Todd et al., J. Chem. Soc. 1601 (1936) and by the procedure described by Cerecedo et al., J. Amer. Chem. Soc., 59, 1714 (1937). Ethyl 2-ethylthio-4-hydroxypyrimidine-5-acetate may be prepared according to the procedure described by Johnson et al., Am. Chem. J., 38, 602 (1907). Ethyl 2-mercapto-4-methyl-6-hydroxypyrimidine-5-acetate may be prepared by the procedures described by Andersag et al., Ber., 70, 2035 (1937). Ethyl 2-mercapto-4-hydroxypyrimidine-5-acetate may be prepared according to the procedure described by Johnson et al., J. Amer. Chem. Soc. 33, 758 (1911).

The following examples illustrate the best modes contemplated for carrying out this invention but are given for purposes of illustration only and not in limitation. All temperatures are given in degrees centigrade.

*Example 1*

(a) *2,4-dimethyl-6-hydroxypyrimidine-5-acetic acid.*— To a solution of sodium methoxide (54.0 g.; 1.0 mole) in 650 ml. of absolute alcohol, there is added acetamidine hydrochloride (94.5 g.; 1.0 mole). An exothermic reaction occurs accompanied by the precipitation of NaCl. The mixture is stirred for 15 minutes and filtered slowly to remove the precipitated NaCl. The filtrate is then added to a solution of sodium methoxide (54.0 g.; 1.0 mole) in 650 ml. of absolute alcohol. To this mixture there is then added dropwise with stirring a solution of diethyl acetosuccinate (216 g.; 1.9 mole) in 200 ml. of absolute alcohol. After the addition is complete, the mixture is stirred for one hour at room temperature and then refluxed for twelve hours. The solvent is stripped off under reduced pressure, and the residue is dissolved in a solution of sodium hydroxide (80.0 g.; 2.0 mole) in 500 ml. of water. After heating on a steam bath for 45 minutes, the solution is cooled and acidified to a pH of about 4 by the addition of HCl. A precipitate forms which is recovered by filtration. The product is washed with cold water and acetone and dried in vacuo over phosphorus pentoxide. The product, 2,4-dimethyl-6-hydroxypyrimidine-5-acetic acid (109 g.; 60% of theoretical yield), is found to have a melting point of 235–238° C. with decomposition. Recrystallization of 2,4-dimethyl-6-hydroxypyrimidine-5-acetic acid from acetone-water afforded the analytical sample, M.P. 240–241°.

*Analysis.*—Calc'd for $C_8H_{10}N_2O_3$: C, 52.74; H, 5.53; N, 15.38. Found: C, 52.69; H, 5.76; N, 15.33.

(b) *2,4-dimethyl - 6 - hydroxypyrimidine-5-N-methyl-acetamide.*—To a stirred suspension of 2,4-dimethyl-6-hydroxypyrimidine-5-acetic acid (15.0 g.; 0.0825 mole) in 400 ml. of anhydrous acetonitrile, there is added triethylamine (11.5 ml.; 8.33 g.; 0.0825 mole). After solution is complete, the temperature is lowered to −10° C. and there is added ethylchloroformate (7.9 ml.; 9.0 g.; 0.83 mole) over a two-minute period. After stirring an additional two minutes at −10° C., the cooling bath is removed and there is added a solution of 15 g. of methylamine in 50 ml. of dry tetrahydrofuran. This addition is performed under a nitrogen atmosphere. A white precipitate is immediately formed. The mixture is stirred vigorously and allowed to warm to room temperature over a 1.5-hour period. The product, 2,4-dimethyl-6-hydroxy-pyrimidine-5-N-methylacetamide, is collected by filtration, dried and recrystallized from 95% ethanol. The product (10.7 g.; 66.5% of theoretical yield) is found to have a melting point of 272–275° C.

*Analysis.*—Calc'd for $C_9H_{13}N_3O_2$: C, 55.37; H, 6.71; N, 21.53. Found: C, 55.30; H, 6.70; N, 21.60.

This compound is useful as an antibody suppressant.

(c) *2,4,7 - trimethyl - 6 - chloropyrrolo[2,3-d]pyrimidine.*—A solution of 5.46 g. (0.028 mole) 2,4-dimethyl-6-hydroxypyrimidine-5-N-methylacetamide and 150 ml. of phosphorus oxychloride was refluxed for one hour and worked up as described in Example 6. Evaporative distillation of the crude material at 160–170°/0.04 mm. afforded 2.94 g. (53.7%) of 2,4,7-trimethyl-6-chloropyrrolo[2,3-d]pyrimidine, M.P. 77–79.5° C. with softening at 64° C.

*Analysis.*—Calc'd for: $C_9H_{10}N_3Cl$: C, 55.25; H, 5.15; N, 21.48; Cl, 18.12. Found: C, 55.40; H, 5.22; N, 21.55; Cl, 18.40.

(d) *2,4,7 - trimethylpyrrolo[2,3-d]pyrimidine hydrochloride.*—A solution of 5.0 g. (0.0256 mole) 2,4-dimethyl-6-hydroxypyrimidine - 5 - N-methylacetamide and 150 ml. phosphorus oxychloride was refluxed for one hour and worked up as described in Example 6. The crude 2,4,7-trimethyl - 6 - chloropyrrolo[2,3-d]-pyrimidine was dissolved in 100 ml. ethanol to which was added 3.58 ml. (0.0256 mole, 2.9 g.) triethylamine and 500 mg. 10% palladium on carbon. After hydrogenation on the Parr apparatus and filtration through "Super Cel" (diatomaceous earth), the ethanol was removed and aqueous sodium bicarbonate was added. After several extractions with benzene, the combined extracts were washed with brine, dried and rendered free of solvent. To the crude 2,4,7-trimethylpyrrolo[2,3-d]pyrimidine was added 200 ml. of dry ether. While efficiently cooled, gaseous hydrochloric acid was passed through the solution for three minutes. The product was filtered, dried and recrystallized from absolute alcohol. In this manner, there was obtained 3.48 g. (68.9%) of recrystallized 2,4,7-trimethylpyrrolo-[2,3-d]pyrimidine hydrochloride, M.P. 277–281° (d).

*Analysis.*—Calc'd for $C_9H_{12}N_3Cl$: C, 54.68; H, 6.12; N,21.26; Cl, 17.94. Found: C, 54.75; H, 6.23; N, 21.40; Cl, 17.95.

A sample of 2,4,7-trimethylpyrrolo[2,3-d]pyrimidine was evaporatively distilled at 60°/0.04 mm. The analytical sample had a M.P. 45–48°.

*Analysis.*—Calc'd for $C_9H_{11}N_3$: C, 67.05; H, 6.88; N, 26.07. Found: C, 67.20; H, 6.83; N, 26.22.

Example 2

(a) *2,4-dimethyl - 6 - hydroxypyrimidine-5-N-cyclopropylacetamide.*—The mixed anhydride of 2,4-dimethyl-6-hydroxypyrimidine-5-acetic acid (11.0 g.; 0.0605 mole) is prepared in the same manner as described in Example 1b using 6.1 g. of triethylamine (0.0605 mole; 8.5 ml.) and 6.6 g. of ethylchloroformate (0.0605 mole; 5.8 ml.). The mixture is stirred for two minutes and there is then added cyclopropylamine (3.5 g.; 0.0615 mole) in 40 ml. of tetrahydrofuran accompanied by a flow of nitrogen. The mixture is then stirred vigorously for 30 minutes and the resultant precipitate is collected by filtration and thoroughly dried. The product, 2,4-dimethyl-6-hydroxypyrimidine-5-N-cyclopropylacetamide (8.39 g.; 62.7% of theoretical yield) is found to have a melting point of 272–274° C. with decomposition.

*Analysis.*—Calc'd for $C_{11}H_{15}N_3O_2$: C, 59.71; H, 6.83; N, 18.99. Found: C, 59.65; H, 6.95; N, 19.00.

(b) *2,4 - dimethyl-7-cyclopropylpyrrolo[2,3-d]pyrimidine hydrochloride.*—A solution of 4.0 g. (0.0181 mole) of 2,4-dimethyl - 6 - hydroxypyrimidine-5-N-cyclopropylacetamide and 100 ml. phosphorus oxychloride was refluxed for 50 minutes and worked up as described in Example 6(b). The crude 2,4-dimethyl-6-chloro-7-cyclopropylpyrrolo[2,3-d]pyrimidine was dissolved in 100 ml. ethanol to which was added 2.5 ml. (0.0181 mole, 1.81 g.) triethylamine and 100 mg. of 10% palladium on carbon. Hydrogenation and workup was carried out as described in Example 1(d). Preparation of the hydrochloride as described in Example 1d afforded 3.21 g. (79.2%) of crude 2,4-dimethyl-7-cyclopropylpyrrolo-[2,3-d]pyrimidine hydrochloride, which when recrystallized from ethanol-ether gave an M.P. of 231–240° (d) with slow decomposition from 196°.

*Analysis.*—Calc'd for $C_{11}H_{14}N_3Cl$: C, 59.06; H, 6.31; N, 18.78; Cl, 15.85. Found: C, 59.00; H, 6.54; N, 18.85; Cl, 15.70.

Example 3

(a) *2,4-dimethyl - 6 - hydroxypyrimidine-5-N-benzylacetamide.*—The mixed anhydride of 2,4-dimethyl-6-hydroxypyrimidine-5-acetic acid (5.5 g.; 0.03 mole) is prepared as described in Example 1(b) using 3.3 g. of ethylchloroformate (0.03 mole; 2.9 ml.) and 3.1 g. of triethylamine (0.03 mole; 4.3 ml.). The mixture is stirred for two minutes at −10° C. and then the cooling bath is removed. There is then added, accompanied by a strong flow of nitrogen, a solution of benzylamine (3.2 g.; 0.03 mole) in 25 ml. of dry tetrahydrofuran. Precipitation of the product beings immediately. The reaction mixture is stirred vigorously for 45 minutes and 300 ml. of water are then added. The precipitated product is collected by filtration, washed with water and dried. The product, 2,4 - dimethyl-6-hydroxypyrimidine-5-N-benzylacetamide (6.0 g.; 74.1% of theoretical yield), is obtained in a high degree of purity. The sample is recrystallized from a mixture of isopropyl alcohol and water and is found to have a melting point of 276–278° C. with darkening at 275° C.

*Analysis.*—Calc'd for $C_{15}H_{17}N_3O_2$: C, 66.40; H, 6.32; N, 15.49. Found: C, 66.60; H, 6.35; N, 15.78.

(b) *2,4-dimethyl - 7 - benzylpyrrolo[2,3-d]pyrimidine hydrochloride.*—A solution of 8.5 g. (0.0314 mole) of 2,4 - dimethyl-6-hydroxypyrimidine-5-N-benzylacetamide in 100 ml. phosphorous oxychloride was refluxed for one hour and worked up as described in Example 6(b), except that methylene chloride was used as the extraction solvent. The crude 2,4-dimethyl-6-chloro-7-benzylpyrrolo[2,3-d] pyrimidine was dissolved in 200 ml. ethanol to which was added 3.95 ml. (0.0314 mole, 2.86 g.) of triethylamine and 400 mg. of 10% palladium on carbon. The hydrogenation and its workup was carried out as described in Example 1d. Preparation of the hydrochloride was carried out as described in Example 1d. Recrystallization from isopropyl alcohol afforded 6.0 g. (70.0%) of 2,4-dimethyl-7-benzylpyrrolo[2,3-d]pyrimidine hydrochloride, M.P. 225–230° (d).

*Analysis.*—Calc'd for $C_{15}H_{16}N_3Cl$: C, 65.81; H, 5.89; N, 15.35; Cl, 12.95. Found: C, 65.90; H, 6.07; N, 15.35; Cl, 12.95.

Example 4

(a) *2,4-dimethyl-6-hydroxypyrimidine-5-N-(β - phenylethyl)acetamide.*—The mixed anhydride of 2,4-dimethyl-6-hydroxypyrimidine-5-acetic acid (9.1 g.; 0.05 mole) is prepared as described in Example 1(b) using 5.05 g. of triethylamine (0.05 mole; 7.0 ml.) and 6.83 g. of isobutyl chloroformate (0.05 mole; 6.6 ml.). The mixture is stirred for two minutes at −9° C. and there is then added a solution of β-phenylethylamine (6.06 g.; 0.05 mole) in 50 ml. of dry tetrahydrofuran. The cooling bath is then removed and the reaction mixture is stirred vigorously for one hour. The precipitated product is collected by filtration, dried and recrystallized from a mixture of ethanol and water. The product, 2,4-dimethyl-6 - hydroxypyrimidine-5-N-(β-phenylethyl)acetamide (10.0 g.; 70.4% of theoretical yield), is found to have a melting point of 258–261° C.

*Analysis.*—Calc'd for $C_{16}H_{19}N_3O_2$: C, 67.34; H, 6.71; N, 14.73. Found: C, 67.20; H, 6.67; N, 15.00.

(b) *2,4 - dimethyl - 7-(β-phenylethyl)pyrrolo[2,3-d] pyrimidine hydrochloride.*—A solution of 5.0 g. (0.0176 mole) of 2,4-dimethyl - 6 - hydroxypyrimidine-5-N-(β-phenylethyl)acetamide in 100 ml. phosphorus oxychloride was refluxed for two hours and worked up as described in Example 6(b). The crude 2,4-dimethyl-6-chloro-7-(β-phenylethyl)pyrrolo[2,3-d]pyrimidine was subjected to hydrogenation as described in Example 1d. Formation of the hydrochloride as described in Example 1d afforded 4.5 g. of crude 2,4-dimethyl-7-(β-phenylethyl-pyrrolo [2,3-d]pyrimidine hydrochloride. Recrystallization from isopropanol, ethyl acetate-ethanol, or water affords a material the NMR and IR spectra of which indicate the presence of solvent of recrystallization along with the desired product.

Example 5

(a) *2,4 - dimethyl - 6 - hydroxyprrimidine-5-N-[β-(1-morpholino)ethyl]acetamide.*—The mixed anhydride of 2,4-dimethyl-6-hydroxypyrimidine-5-acetic acid (5.5 g.; 0.0302 mole) is prepared as described in Example 1(b) using 3.05 g. of triethylamine (0.0302 mole; 4.23 ml.) and 4.14 g. of isobutyl chloroformate (0.0302 mole; 3.98 ml.). The mixture is stirred for two minutes at −8° C. and there is then added a solution of N-(β-aminoethyl)morpholine (4.0 g.; 0.0308 mole) in 30 ml. of tetrahydrofuran accompanied by a strong flow of nitrogen. The cooling bath is then removed and the mixture is stirred vigorously for one hour. The resultant precipitate is collected by filtration, thoroughly washed with dry methylene chloride to leach out the triethylamine hydrochloride, and dried. The product, 2,4-dimethyl-6-hydroxypyrimidine - 5 - N-[β-(1-morpholino)ethyl]acetamide (7.22 g.; 81.4% of theoretical yield), is recrystallized from a mixture of ethanol and water. The recrystallized product is found to have a melting point of 252–255° C. with decomposition.

*Analysis.*—Calc'd for $C_{14}H_{22}N_4O_3$: C, 57.12; H, 7.53; N, 19.04. Found: C, 57.25; H, 7.56; N, 19.15.

(b) *2,4-dimethyl-7-[β-(1 - morpholino)ethyl]pyrrolo [2,3-d]pyrimidine dihydrochloride.*—A solution of 3.0 g. (0.0102 mole) of 2,4-dimethyl-6-hydroxypyrimidine-5-N [β-(1-morpholino)ethyl]acetamide in 100 ml. phosphorus oxychloride was refluxed for one hour and worked up as described in Example 6b. The crude 2,4-dimethyl-6-chloro-7-[β-(1-morpholino)ethyl]pyrrolo[2,3 - d]pyrimidine was subjected to hydrogenation as described in Example 1(d). Subsequent workup and preparation of the dihydrochloride was carried out as described in Example 1d. In this manner, there was obtained after recrystallization from ethanol-ether, 2.17 g. (64.7%) of 2,4-dimethyl-7-[β-(1-morpholino)ethyl]pyrrolo[2,3 - d] pyrimidine dihydrochloride, M.P. 280–290° (d.).

*Analysis.*—Calc'd for for $C_{14}H_{22}N_4OCl_2$: C, 50.46; H, 6.66; N, 16.81; Cl, 21.27. Found: C, 50.70; H, 6.80; N, 16.80; Cl, 21.55.

Example 6

(a) *2 - methyl - 4-hydroxypyrimidine-5-N-methylacetamide.*—To 350 ml. of ethanol containing approximately 60 g. of methylamine, there is added ethyl 2-methyl-4-hydroxypyrimidine-5-acetate (11.7 g.; 0.0596 mole). The resulting clear solution is allowed to stand at room temperature for eight days under anhydrous conditions. Subsequently, the excess methylamine is driven off by heating on a steam bath and the remaining solvent is removed under reduced pressure. While white solid residue is recrystallized from absolute alcohol. The product, 2-methyl-4-hydroxypyrimidine-5 - N-methylacetamide (10.0 g.; 92.6% of theoretical yield), is found to have a melting point of 215–217° C.

*Analysis.*—Calc'd for $C_8H_{11}N_3O_2$: C, 53.03; H, 6.12; N, 23.19. Found: C, 53.00; H, 5.96; N, 23.15.

(b) *2,7-dimethyl-6 - chloropyrrolo[2,3-d]pyrimidine.*—A solution of 42.8 g. (0.236 mole) 2-methyl-4-hydroxypyrimidine-5-N-methylacetamide and 500 ml. phosphorus oxychloride was heated at reflux for one hour. Excess phosphorus oxychloride was removed under reduced pressure and the residue poured over ammonium hydroxide-ice water layered with benzene-ether. When hydrolysis was complete and the aqueous layer remained basic, the organic layer was separated and the aqueous layer washed twice with benzene. The combined organic extracts were washed with brine, dried over sodium sulfate and filtered. Removal of solvent afforded 37.2 g. (88.9%) of solid 2,7-dimethyl - 6 - chloropyrrolo[2,3-d]pyrimidine. A small sample was sublimed for analysis, M.P. 104–106°.

*Analysis.*—Calc'd for $C_8H_8N_3Cl$: C, 52.90; H, 4.44; N, 23.14; Cl, 19.52. Found: C, 53.10; H, 4.42; N, 23.05; Cl, 19.70.

(c) *2,7-dimethylpyrrolo[2,3-d]pyrimidine.*—To a solution of 2.1 g. (0.012 mole) 2,7-dimethyl-6-chloropyrrolo-[2,3-d]pyrimidine and 1.21 g. (0.012 mole, 1.67 ml.) triethylamine in 100 ml. ethanol was added 1.0 g. 5% palladium on carbon. Theoretical uptake of hydrogen was complete in five minutes on the Parr apparatus. After filtration through "Super Cel" and removal of the ethanol, the residue was washed thoroughly with benzene and filtered by gravity. Removal of the benzene from the filtrate afforded 1.3 g. (73.6%) of crude 2,7-dimethylpyrrolo[2,3 - d]pyrimidine which was sublimed at 75°/0.1 mm., M.P. 65–68° with softening at 63°.

*Analysis.*—Calc'd. for $C_8H_9N_3$: C, 65.28; H, 6.16; N, 28.55. Found: C, 65.25; H, 5.97; N, 28.60.

Example 7

(a) *2 - methylthio-4-methyl-6-hydroxypyrimidine-5-N-methylacetamide.*—To a solution of 4.26 g. (0.02 mole) 2 - mercapto-4-methyl-6-hydroxypyrimidine-5-N-methylacetamide and 1.08 g. (0.02 mole) sodium methoxide in 30 ml. methanol was added 12 ml. of methyl iodide. After about five minutes a heavy precipitate deposited which necessitated the addition of more methanol to facilitate stirring. After 45 minutes, the reaction mixture was cooled and filtered. Recrystallization from water-ethanol afforded 3.0 g. (66.1%) of 2-methylthio-4-methyl-6-hydroxypyrimidine-5 - N-methylacetamide, M.P. 266–269° (d).

*Analysis.*—Calc'd for $C_9H_{13}N_3O_2S$: C, 47.55; H, 5.76; N, 18.49; S, 14.11. Found: C, 47.70; H, 5.77; N, 18.42; S, 14.35.

(b) *2 - methylthio-4,7 - dimethyl-6-chloropyrrolo[2,3-d]-pyrimidine.*—A solution of 5.0 g. (0.022 mole) 2-methylthio-4-methyl-6-hydroxypyrimidines - 5 - N-methylacetamide in 100 ml. phosphorus oxychloride was refluxed for one hour and worked up as described in Example 6(b). Recrystallization of the evaporatively distilled material from isopropyl alcohol afforded 2.92 g. (58.2%) of 2-methylthio-4,7-dimethyl-6 - chloropyrrolo[2,3-d]-pyrimidine, M.P. 76–77°.

*Analysis.*—Calc'd for $C_9H_{10}N_3SCl$: C, 47.46; H, 4.43; N, 18.45; S, 14.08; Cl, 15.57. Found: C, 47.68; H, 4.61; N, 18.57; S, 14.19; Cl, 15.79.

Example 8

(a) *Ethyl 2 - phenyl-4-hydroxypyrimidine-5-acetate.*—A solution of 108.0 g. (0.90 mole) benzamidine in ethanol was prepared by the addition of 140.4 g. (0.90 mole) benzamidine hydrochloride to 900 ml. ethanol containing 20.7 g. (0.90 mole) dissolved sodium. After stirring for ten minutes the solution was filtered from the precipitated sodium chloride. To this solution of benzamidine in ethanol was added with adequate stirring, a solution of 179.5 g. (0.90 mole) diethyl formylsuccinate in 100 ml. ethanol. After refluxing for 18 hours, the reaction mixture was cooled and the product filtered by suction. In this manner, there was obtained, 125 g. (54%) of ethyl 2-phenyl-4-hydroxypyrimidine-5-acetate, M.P. 169–175°.

*Analysis.*—Calc'd for $C_{14}H_{14}N_2O_3$: C, 65.10; H, 5.46; N, 10.85. Found: C, 65.00; H, 5.51; N, 10.88.

(b) *2 - phenyl - 4-hydroxypyrimidine-5-N-methylacetamide.*—A mixture of ethyl 2-phenyl-4-hydroxypyrimidine-5-acetate (20.0 g.; 0.0776 mole) in 250 ml. of ethanol is combined with a solution of 70 g. of methylamine in 250 ml. of ethanol. The mixture is allowed to stand at room temperature for four days. Subsequently, the solvent is removed by evaporation, the residue is thoroughly dried and is recrystallized from a mixture of dimethyl formamide and water. The product, 2-phenyl-4-hydroxy-pyrimidine-5-N-methylacetamide (10.1 g.; 53.4% of theoretical yield), is found to have a melting point of 310–315° C. with browning at 305° C.

*Analysis.*—Calc'd for $C_{13}H_{13}N_3O_2$: C, 64.18; H, 5.39; N, 17.28. Found: C, 64.20; H, 5.42; N, 17.35.

(c) *2 - phenyl - 7-methylpyrrolo[2,3-d]pyrimidine.*—A solution of 9.5 g. (0.039 mole) 2-phenyl-4-hydroxypyrimidine-5-N-methylacetamide in 200 ml. of phosphorus oxychloride was refluxed for one hour and worked up as described in Example 6b. The crude 2-phenyl-6-chloro-7-methylpyrrolo[2,3-d]pyrimidine was dissolved in a solution of 150 ml. ethanol and 50 ml. benzene. After the addition of 6.5 ml. (0.0465 mole, 4.7 g.) of triethylamine and 1.5 g. 10% palladium on carbon, hydrogenation was carried out on the Parr apparatus. The product was worked up in the manner described in Example 1d. Recrystallization of the crude material from dry "Skellysolve B" afforded 2.9 g. (35.6%) of 2-phenyl-7-methylpyrrolo[2,3 - d]pyrimidine. Evaporative distillation at 120–130°/0.05 mm. afforded an analytical sample, M.P. 81–83° with softening at 77°.

*Analysis.*—Calc'd for $C_{13}H_{11}N_3$: C, 74.62; H, 5.30; N, 20.08. Found: C, 74.80; H, 5.36; N, 19.91.

Example 9

(a) *2,4-dimethyl-6-hydroxypyrimidine-5-N-t-butylacetamide.*—The mixed anhydride of 2,4-dimethyl-6-hydroxypyrimidine-5-acetic acid (5.5 g.; 0.03 mole) is prepared and subsequently reacted with t-butylamine (2.2 g.; 0.03 mole) in 20 ml. of tetrahydrofuran, all as described in Example 1(b). After the product precipitates, it is collected by filtration and dried. The product, 2,4-dimethyl-6-hydroxypyrimidine - 5 - N - t - butylacetamide (1.81 g.; 25.4% of theoretical yield) is recrystallized from methyl isobutyl ketone. The recrystallized product is determined to have a melting point of 206–207.5° C.

*Analysis.*—Calc'd for $C_{12}H_{19}N_3O_2$: C, 60.73; H, 8.07; N, 17.71. Found: C, 60.50; H, 7.90; N, 17.85.

*Example 10*

(a) *2 - mercapto-4-hydroxypyrimidine-5-N-methylacetamide.*—To a mixture of ethyl 2-mercapto-4-hydroxypyrimidine-5-acetate (5.7 g.; 0.0266 mole) in 100 ml. of methanol, there is added a solution of 6.2 g. of methylamine in 150 ml. of methanol. The mixture is processed as described in Example 13(a) to obtain 2-mercapto-4-hydroxypyrimidine-5-N-methylacetamide (4.3 g.; 81% of theoretical yield). This product is recrystallized from a mixture of water and dimethyl formamide. The recrystallized product is determined to have a melting point of 310–315° C. with decomposition.

*Analysis.*—Calc'd for $C_7H_9N_3O_2S$: C, 42.19; H, 4.55; N, 21.09; S, 16.09. Found: C, 42.00; H, 4.61; N, 21.25; S, 16.20.

(b) *2-ethylthio-4-hydroxypyrimidine-5-N-methylacetamide.*—To a saturated solution of methylamine in 300 ml. of methanol, there is added a slurry of ethyl-2-ethylthio-4-hydroxypyrimidine-5-acetate (30.0 g.; 0.124 mole) in 100 ml. of methanol. The mixture is swirled and complete solution results. This solution is allowed to stand at room temperature for five days. Excess methylamine is then removed by heating the solution on the steam bath, and the remaining solvent is removed under reduced pressure. The residue is slurried in about 150 ml. of cold water and the mixture is carefully acidified by the addition of concentrated HCl. The precipitated solid is collected by filtration, dried and recrystallized from 95% alcohol. The product, 2 - ethylthio - 4 - hydroxypyrimidine-5-N-methylacetamide (17.6 g.; 62.6% of theoretical yield), is found to have a melting point of 203–206.5° C.

*Analysis.*—Calc'd for $C_9H_{13}N_3O_2S$: C, 47.55; H, 5.76; N, 18.49; S, 14.11. Found: C, 47.30; H, 5.68; N, 18.78; S, 14.10.

(c) *2-ethylthio-6-chloro-7-methylpyrrolo[2,3-d]pyrimidine.*—A solution of 16.77 g. (0.0738 mole) of 2-ethylthio-4-hydroxypyrimidine-5-N-methylacetamide and 160 ml. of phosphorus oxychloride was refluxed for 45 minutes and worked up as described in Example 6(b). There was realized 15.6 g. (92.8%) of crude 2-ethylthio-6-chloro-7-methylpyrrolo[2,3-d]pyrimidine. Recrystallization from isopropyl alcohol followed by evaporative distillation at 130°/0.05 mm. afforded a sample for analysis, M.P. 80–82°.

*Analysis.*—Calc'd for $C_9H_{10}N_3SCl$: C, 47.46; H, 4.43; N, 18.45; S, 14.08; Cl, 15.57. Found: C, 47.60; H, 4.52; N, 17.20; S, 14.52; Cl, 15.90.

In the mouse anorexia assay this compound, which had an $LD_{50}$ in the range of 841–951 mgm./kg. p.o., was effective at a dose of 50 mgm./kg. but not at a dose of 25 mgm./kg. In this assay, groups of five mice starved for 16–17 hours are placed in a cage, given the drug to be tested and after another thirty minutes are given a weighed amount of food. One hour after presenting the food, the food dish is removed and weighed. Control mice, i.e., dosed with water, eat an average of 6.2 g. per group of five mice. Significant anorexic activity is exhibited when a group of five treated mice eat less than 2 g. in the hour.

(d) *2-ethylthio-7-methylpyrrolo[2,3-d]pyrimidine hydrochloride.*—A solution of 5.0 g. (0.022 mole) of 2-ethylthio - 6 - chloro - 7 methylpyrrolo[2,3 - di]pyrimidine in 200 ml. ethanol was charged with 2.2 g. (0.022 mole; 3.08 ml.) of triethylamine and 3.0 g. of 30% palladium on diatomaceous earth. Hydrogenation was carried out on the Parr apparatus. An additional gram of catalyst was introduced after one hour. After a total of two hours, the reaction mixture was worked up as in Example 1(d). There was obtained 4.12 g. (96.8%) of crude 2-ethylthio-7-methylpyrrolo[2,3-d]pyrimidine, the hydrochloride of which was prepared as described in Example 1(d). There was realized 4.33 g. (85.6%) of crude 2-ethylthio-7-methylpyrrolo[2,3-d]pyrimidine hydrochloride which when recrystallized from isopropyl alcohol gave an M.P. of 201–206° (d) with browning at 195°.

*Analysis.*—Calc'd for $C_9H_{12}N_3SCl$: C, 47.05; H, 5.27; N, 18.29; Cl, 15.43; S, 13.96. Found: C, 47.15; H, 5.35; N, 18.05; S, 13.88; Cl, 15.35.

*Example 11*

(a) *2 - methylthio - 4 - hydroxypyrimidine-5-N-methylacetamide.*—A solution of 5.0 g. (0.0252 mole) 2-mercapto - 4 - hydroxypyrimidine-5-N-methylacetamide, 1.43 g. (0.0252 mole) sodium methoxide, and 30 ml. methyl iodide was stirred at room temperature for two hours. After removal of the solvent, acetone was added to the residue and the resultant slurry digested slightly on the steam bath. Filtration and thorough washing with acetone afforded 2.5 g. (46.6%) of 2-methylthio-4-hydroxypyrimidine-5-N-methylacetamide. Recrystallization from ethanol afforded the analytical sample, M.P. 213–216°.

*Analysis.*—Calc'd for $C_8H_{11}N_3O_2S$: C, 45.05; H, 5.20; N, 19.71; S, 1503. Found: C, 45.32; H, 5.49; N, 19.64; S, 14.87.

(b) *2 - methylthio - 7 - methyl-6-chloropyrrolo[2,3-d]pyrimidine hydrochloride.*—A solution of 5.0 g. (0.0234 mole) 2-methylthio-6-hydroxypyrimidine-5-N-methylacetamide in 100 ml. phosphorus oxychloride was refluxed for one hour and worked up as described in Example 6(b). A hydrochloride salt was prepared in the usual manner which after recrystallization from ethanol-ether afforded 3.71 g. (63.4%) of 2-methylthio-7-methyl-6-chloropyrrolo[2,3 - d]pyrimidine hydrochloride, M.P. 183–188°.

*Analysis.*—Calc'd for $C_8H_8N_3SCl \cdot HCl$: C, 38.41; H, 3.63; S, 12.81; Cl, 28.35. Found: C, 38.58; H, 3.76; S, 12.96; Cl, 28.56.

*Example 12*

(a) *2-methyl-4-hydroxypyrimidine - 5 - N-phenylacetamide.*—A mixture of ethyl 2-methyl-4-hydroxypyrimidine-5-acetate (10.0 g.; 0.051 mole), aniline (4.6 g.; 0.051 mole) and sodium methoxide (6.0 g.; 0.1 mole) in 80 ml. of dry benzene is refluxed for 24 hours. The mixture is then cooled, and the benzene is decanted. There are then added 25 ml. of water and the mixture is acidified by the addition of 5% HCl. The mixture is then cooled and the precipitate is collected by filtration, washed with water, dried and recrystallized from a mixture of dimethyl formamide and water. The product, 2-methyl-4-hydroxypyrimidine-5-N-phenylacetamide (8.0 g.; 66.6% of theoretical yield), is found to have a melting point of 235–237° C. with softening at 226° C.

*Analysis.*—Calc'd for $C_{13}H_{13}N_3O_2$: C, 64.18; H, 5.39; N, 17.28. Found: C, 65.00; H, 5.52; N, 17.55.

(b) *2-methyl - 7 - phenylpyrrolo[2,3-d]pyrimidine hydrochloride.*—A solution of 4.0 g. (0.0165 mole) of 2-methyl - 4 - hydroxypyrimidine-5-N-phenylacetamide in 130 ml. phosphorus oxychloride was refluxed for 1.5 hours and worked up as described in Example 6(b). The crude 2-methyl-6-chloro-7-phenylpyrrolo[2,3 - d]pyrimidine was subjected to hydrogenation as described in Example 1d. Preparation of the hydrochloride as described in Example 1d afforded 2.25 g. (55.6%) of 2-methyl-7-phenylpyrrolo[2,3-d]pyrimidine hydrochloride recrystallized from ethanol, M.P. 255–264° (d) with browning at 248°.

*Analysis.*—Calc'd for CHNCl: C, 63.54; H, 4.93; N, 17.10; Cl, 14.43. Found C, 63.50; H, 4.93; N, 17.00; Cl, 14.37.

Example 13

(a) *2-mercapto - 4 - methyl-6-hydroxypyrimidine-5-N-methylacetamide.*—To a mixture of ethyl 2-mercapto-4-methyl-6-hydroxypyrimidine-5-acetate (35.0 g.; 0.153 mole) in 200 ml. of methanol, there is added a solution of 100 g. of methylamine in 250 ml. of methanol. The mixture is allowed to stand at room temperature for five days, after which most of the solvent is removed by evaporation. The residue is cooled, collected by filtration and dried. A white crystalline solid is thus obtained which is slurried in 200 ml. of water. The slurry is then rendered acidic by the addition of acetic acid. A thick precipitate is formed which is collected by filtration, washed with water and acetone and dried. The product, 2-mercapto - 4 - methyl-6-hydroxypyrimidine-5-N-methylacetamide (28.8 g.; 88.1% of theoretical yield), is found to have a melting point of 299–303° C. with decomposition.

*Analysis.*—Calc'd for $C_8H_{11}N_3O_2S$: C, 45.05; H, 5.20; N, 19.71; S, 15.03. Found: C, 44.95; H, 5.07; N, 19.85; S, 15.03.

(b *2 - ethylthio - 4 - methyl-6-hydroxypyrimidine-5-N-methylacetamide.*—Preparation of the mixed anhydride of 10.0 g. (0.044 mole) 2-ethylthio-4-methyl-6-hydroxypyrimidine-5-acetic acid, prepared according to the procedure of Johnson and Heyl, addition of the methylamine, and subsequent workup was carried out essentially as described in Example 1(b), except that tetrahydrofuran was used as the solvent. The crude material was dissolved in ca. 75 ml. water and acidified to pH 6.5 with hydrochloric acid. The precipitate so obtained was collected and dried. In this manner, there was obtained 5.5 g. (51.9%) of 2-ethylthio-4-methyl-6-hydroxypyrimidine-5-N-methylacetamide. Recrystallization from water afforded the analytical sample, M.P. 243–245° with sweating at 238°.

(c) *2 - ethylthio - 4,7-dimethyl-6-chloropyrrolo[2,3-d]-pyrimidine hydrochloride.*—A solution of 5.0 g. (0.0208 mole) 2-ethylthio - 4 - methyl-6-hydroxypyrimidine-5-N-methylacetamine in 100 ml. phosphorus oxychloride was refluxed for one hour and worked up as described in Example 6(b). A hydrochloride salt was prepared in the usual manner and recrystallized from ethanol-ether. In this manner, there was obtained 4.2 g. (72.7%) of 2-ethylthio-4,7-dimethly-6-chloropyrrolo[2,3 - d]pyrimidine hydrochloride, M.P. 179.5 to 185°.

*Analysis.*—Calc'd for $C_{10}H_{12}N_3SCl \cdot HCl$: C, 43.17; H, 4.71; N, 15.10; Cl, 25.49; S, 11.53. Found: C, 43.00; H 4.73; N, 15.32; Cl, 25.38; S, 11.54.

Example 14

(a) *2,4 - dimethyl - 6 - hydroxypyrimidine - 5 - N-propargylacetamide.*—Preparation of the mixed anhydride of 9.1 g. (0.05 mole) 2,4-dimethyl-6-hydroxypyrimidine-5-acetic acid, addition of 2.8 g. (0.051 mole) monopropargylamine, and subsequent workup was carried out essentially as described in Example 1(b). Recrystallization from 95% alcohol-water afforded 5.89 g. (53.8%) of 2,4-dimethyl - 6 - hydroxypyrimidine-5-N-propargylacetamide, M.P. 257–258° (d).

*Analysis.*—Calc'd for $C_{11}H_{13}N_3O_2$: C, 60.26; H, 5.98; N, 19.15. Found: C, 60.40; H, 5.97; N, 19.32.

(b) *2,4 - dimethyl - 6 - chloro - 7 - propargylpyrrolo[2,3-d]pyrimidine hydrochloride.*—A solution of 5.0 g. (0.028 mole) 2,4-dimethyl-6-hydroxypyrimidine-5-N-propargylacetamide in 100 ml. phosphorus oxychloride was refluxed for one hour and worked up as described in Example 6(b). In this manner, there was obtained 2.0 g. (32.5%) of the free base, 2,4-dimethyl-6-chloro-7-propargylpyrrolo[2,3-d]pyrimidine, M.P. 125–129°. The hydrochloride salt, 2,4-dimethyl-6-chloro-7-propargylpyrrolo[2,3-d]-pyrimidine hydrochloride, was prepared in the usual manner and recrystallized from ethanol-ether, M.P 249–251° with browning from 210°.

*Analysis.*—Calc'd for $C_{11}H_{10}N_3Cl$: C, 60.15; H, 4.59; N, 19.13. Found: C, 60.27; H, 4.72; N, 19.22.

*Analysis.*—Calc'd for $C_{11}H_{10}N_3Cl \cdot HCl$: C, 51.58; H, 4.33; N, 16.41; Cl, 27.68. Found: C, 51.68; H, 4.41; N, 16.32; Cl, 27.53.

Example 15

(a) *2,4 - dimethyl - 6 - hydroxypyrimidine - 5 - N - (2-diethylaminoethyl)acetamide.*—Preparation of the mixed anhydride of 11.0 g. (0.0604 mole) 2,4-dimethyl-6-hydroxypyrimidine-5-acetic acid, addition of 7.0 g. (0.0604 mole) of 2-diethylaminoethylamine, and subsequent workup was carried out essentially as described in Example 1(b). In this manner, there was obtained 7.0 g. (59.8%) of 2,4-dimethyl-6-hydroxypyrimidine-5-N-(2-diethylaminoethyl)acetamide. Recrystallization from acetonitrile afforded the analytical sample, M.P. 165–166°.

*Analysis.*—Calc'd for $C_{14}H_{24}N_4O_2$: C, 59.97; H, 8.63; N, 19.99. Found: C, 59.98; H, 8.48; N, 19.97.

(b) *2,4 - dimethyl - 7 - (2 - diethylaminoethyl) - 6-chloropyrrolo[2,3-d]pyrimidine dihydrochloride.*—A solution of 3.0 g. (0.0107 mole) 2,4-dimethyl-6-hydroxypyrimidine-5-N-(2-diethylaminoethyl)acetamide in 35 ml. phosphorus oxychloride was refluxed for one hour and worked up as described in Example 6b. The dihydrochloride salt was prepared in the usual manner which after recrystallization from ethanol-ether afforded 2.0 g. (52.8%) of 2,4-dimethyl-7-(2 - diethylaminoethyl) - 6-chloropyrrolo[2,3-d]pyrimidine dihydrochloride, M.P. 247–250° (d).

*Analysis.*—Calc'd for $C_{14}H_{21}N_4Cl \cdot 2HCl$: C, 47.53; H, 6.55. Found: C, 47.48; H, 6.53.

(c) *2,4 - dimethyl - 7 - (2 - diethylaminoethyl)pyrrolo[2,3-d]pyrimidine dihydrochloride.*—A solution of 3.5 g. (0.0125 mole) 2,4-dimethyl-6-hydroxypyrimidine-5-N-(2-diethylaminoethyl)acetamide in 40 ml. phosphorus oxychloride was refluxed for one hour. Subsequent manipulations were carried out in a manner analogous to Example 6(b). In this manner, there was obtained 2.84 g. (71.2%) of 2,4 - dimethyl - 7 - (2 - diethylaminoethyl)pyrrolo-[2,3-d]pyrimidine dihydrochloride. Recrystallization from ethanol-ether afforded the analytical sample, M.P. 251–254° (d).

*Analysis.*—Calc'd for $C_{14}H_{22}N_4 \cdot 2HCl$: C, 52.66; H, 7.58; N, 17.55; Cl, 22.21. Found: C, 52.86; H, 7.76; N, 17.31; Cl, 22.21.

Example 16

(a) *2,4 - dimethyl - 6 - hydroxypyrimidine - 5 - N - isopropylacetamide.*—Preparation of the mixed anhydride of 5.0 g. (0.027 mole) 2,4-dimethyl-6-hydroxypyrimidine-5-acetic acid using isobutyl chloroformate, addition of 1.67 g. (0.028 mole) isopropylamine, and subsequent workup was carried out essentially as described in Example 1(b). Recrystallization from dimethylformamide afforded 4.0 g. (66.6%) of 2,4-dimethyl-6-hydroxypyrimidine-5-N-isopropylacetamide, M.P. 277–280° (d).

*Analysis.*—Calc'd for $C_{11}H_{17}N_3O_2$: C, 59.17; H, 7.68; N, 18.82. Found: C, 58.90; H, 7.47; N, 19.02.

(b) *2,4 - dimethyl - 7 - isopropylpyrrolo[2,3-d]pyrimidine hydrochloride.*—A solution of 5.0 g. (0.0224 mole) 2,4 - dimethyl - 6 - hydroxypyrimidine - 5 - N - isopropylacetamide in 100 ml. phosphorus oxychloride was refluxed for one hour. Subsequent manipulations were carried out in a manner analogous to Example 6(b). In this manner, there was obtained 3.68 g. (72.7%) of 2,4-dimethyl - 7 - isopropylpyrrolo[2,3-d]pyrimidine hydrochloride. Recrystallization from methyl isobutyl ketone followed by sublimation at 105–110°/0.05 mm. afforded the analytical sample, M.P. 218–221° (d).

*Analysis.*—Calc'd for $C_{11}H_{15}N_3 \cdot HCl$: C, 58.53; H, 7.15; N, 18.62; Cl, 15.70. Found: C, 58.80; H, 7.16; N, 18.82; Cl, 15.80.

Example 17

(a) *2,4 - dimethyl - 6 - hydroxypyrimidine - 5 - N-cyclopentylacetamide.*—Preparation of the mixed anhydride of 9.1 g. (0.05 mole) 2,4-dimethyl-6-hydroxypyrimidine-5-acetic acid, addition of 4.7 g. (0.055 mole) cyclopentylamine, and subsequent workup was carried out essentially as described in Example 1(b). Recrystallization from dimethylformamide afforded 8.2 g. (66.1%) of 2,4 - dimethyl - 6 - hydroxypyrimidine - 5 - N - cyclopentylacetamide, M.P. 300–304° (d) with softening at 295°.

Analysis.—Calc'd for $C_{13}H_{19}N_3O_2$: C, 62.62; H, 7.68; N, 16.86. Found: C, 62.45; H, 7.71; N, 17.15.

(b) 2,4 - dimethyl - 7 - cyclopentylpyrrolo[2,3-d]pyrimidine hydrochloride.—A solution of 5.0 g. (0.02 mole) 2,4 - dimethyl - 6 - hydroxypyrimidine - 5 - N - cyclopentylacetamide in 100 ml. phosphorus oxychloride was refluxed for one hour. Subsequent manipulations were carried out in a manner analogous to Example 6(b). In this manner, there was obtained 3.78 g. (75.1%) of 2,4-dimethyl - 7 - cyclopentylpyrrolo[2,3-d]pyrimidine hydrochloride. Recrystallization from ethanol-ether, afforded the analytical sample, M.P. 220–225° (d).

Analysis.—Calc'd for $C_{13}H_{17}N_3 \cdot HCl$: C, 62.00; H, 7.20; N, 16.68; Cl, 14.09. Found: C, 61.90; H, 7.14; N, 16.75; Cl, 14.28.

*Example 18*

(a) 2,4 - dimethyl-6-hydroxypyrimidine-5-N-cyclohexylacetamide.—Preparation of the mixed anhydride of 9.1 g. (0.05 mole) 2,4-dimethyl-6-hydroxypyrimidine-5-acetic acid using isobutyl chloroformate, addition of 5.45 g. (0.055 mole) cyclohexylamine, and subsequent workup was carried out essentially as described in Example 1(b). Recrystallization from dimethylformamide afforded 9.8 g. (76%) of 2,4-dimethyl-6-hydroxypyrimidine-5-N-cyclohexylacetamide, M.P. 325–329° (d) with gradual decomposition from 297°.

Analysis.—Calc'd for $C_{14}H_{21}N_3O_2$: C, 63.85; H, 8.04; N, 15.96. Found: C, 63.55; H, 7.97; N, 16.20.

(b) 2,4 - dimethyl - 7-cyclohexylpyrrolo[2,3-d]pyrimidine hydrochloride.—A solution of 3.46 g. (0.0132 mole) 2,4 - dimethyl - 6-hydroxypyrimidine-5-N-cyclohexylacetamide in 100 ml. phosphorous oxychloride was refluxed for one hour. Subsequent manipulations were carried out in a manner analogous to Example 6(b). In this manner, there was obtained 1.78 g. (50.8%) of 2,4-dimethyl - 7-cyclohexylpyrrolo[2,3-d]pyrimidine hydrochloride. Recrystallization from ethanol-ether followed by sublimation afforded the analytical sample, M.P. 225–230° (d).

Analysis.—Calc'd for $C_{14}H_{19}N_3 \cdot HCl$: C, 63.26; H, 7.59; N, 15.81; Cl, 13.34. Found: C, 63.90; H, 7.85; N, 16.02; Cl, 13.50.

*Example 19*

(a) 2 - methyl - 4-hydroxypyrimidine-5-N-benzylacetamide.—A mixture of 10.0 g. (0.051 mole) ethyl 2-methyl-4-hydroxypyrimidine-5-acetate, 5.45 g. (0.051 mole) benzylamine, and 5.5 g. (0.102 mole) sodium methoxide in 100 ml. dry benzene was refluxed for two hours and worked up as described in Example 12(a). Recrystallization from ethanol-water afforded 5.05 g. (38.6%) of 2-methyl-4-hydroxypyrimidine-5-N-benzylacetamide, M.P. 229–232°.

Analysis.—Calc'd for $C_{14}H_{15}N_3O_2$: C, 65.35 H, 5.88; N, 16.33. Found: C, 65.65; H, 5.79; N, 16.63.

(b) 2 - methyl - 7 - benzylpyrrolo[2,3-d]pyrimidine hydrochloride.—A solution of 4.25 g. (0.0165 mole) 2-methyl-6-hydroxypyrimidine-5-N-benzylacetamide in 100 ml. phosphorous oxychloride was refluxed for one hour. Subsequent manipulations were carried out in a manner analogous to Example 6(b). In this manner, there was obtained 3.26 g. (73.6%) of 2-methyl-7-benzylpyrrolo[2,3-d]pyrimidine hydrochloride. Recrystallization from isopropanol followed by sublimation afforded the analytical sample, M.P. 229–232° with sweating at 215°.

Analysis.—Calc'd for $C_{14}H_{13}N_3 \cdot HCl$: C, 64.74; H, 5.43; N, 16.17; Cl, 13.66. Found: C, 65.00; H, 5.57; N, 16.40; Cl, 13.40.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:

1. A member selected from the group consisting of compounds of the formula

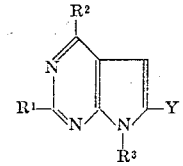

wherein X is a member selected from the group consisting of chloro and bromo, $R^1$ is a member selected from the group consisting of (lower)alkyl, (lower)alkylthio and —Ar in which Ar is a member selected from the group consisting of radicals of the formula

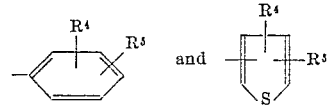

in which $R^4$ and $R^5$ are each members selected from the group consisting of hydrogen, chloro, bromo, (lower)alkyl, (lower)alkoxy and trifluoromethyl, $R^2$ is a member selected from the group consisting of hydrogen, (lower)alkyl and —Ar, and $R^3$ is a member selected from the group consisting of (lower)alkyl, (lower)cycloalkyl containing from 3 to 8 carbon atoms inclusive, (lower)alkenyl, (lower)alkynyl, di(lower)alkylamino(lower)alkyl, piperidino(lower)alkyl, morpholino(lower)alkyl, N'-(lower)alkylpiperazino(lower)alkyl, —Ar and $$—(CH_2)_n—Ar$$

wherein $n$ is an integer from one to three inclusive; and the nontoxic, pharmaceutically acceptable acid addition salts thereof.

2. A compound of the formula

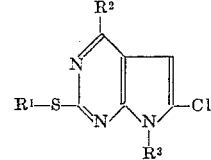

in which $R^1$, $R^2$ and $R^3$ each represent (lower)alkyl.

3. A compound of the formula

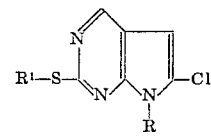

in which R and $R^1$ each represent (lower)alkyl.

4. A compound of the formula

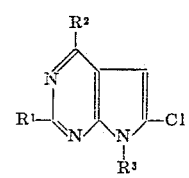

in which $R^1$, $R^2$ and $R^3$ each represent (lower)alkyl.

5. A compound of the formula

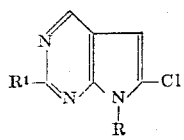

in which R and R¹ each represent (lower)alkyl.

6. A compound of the formula

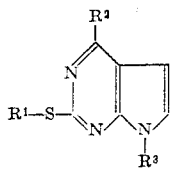

in which R¹, R² and R³ each represent (lower)alkyl.

7. A compound of the formula

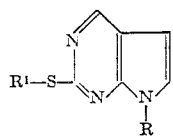

in which R and R¹ each represent (lower)alkyl.

8. A compound of the formula

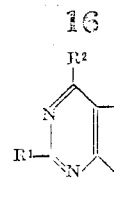

in which R¹, R² and R³ each represent (lower)alkyl.

9. 2-ethylthio-6-chloro-7 - methylpyrrolo[2,3-d]pyrimidine.
10. 2-ethylitho-7-methylpyrrolo[2,3-d]pyrimidine.
11. 2-methylthio-7 - methyl-6 - chloropyrrolo[2,3-d]pyrimidine hydrochloride.
12. 2-methylthio - 7-methyl-6 - chloropyrrolo[2,3-d]pyrimidine.
13. 2-ethylthio-4,7 - dimethyl-6 - chloropyrrolo[2,3-d]pyrimidine hydrochloride.
14. 2-ethylthio - 4,7-dimethyl-6 - chloropyrrolo[2,3-d]pyrimidine.
15. 2-methylthio - 4,7-dimethyl-6 - chloropyrrolo[2,3-d]pyrimidine.

References Cited by the Examiner

FOREIGN PATENTS 915,304  1/1963  Great Britain.

OTHER REFERENCES

Davoll: Jour. Chem. Soc., 1960, pages 131–138.

ALEX MAZEL, *Primary Examiner.*

MARY U. O'BRIEN, *Assistant Examiner.*

UNITED STATES PATENT OFFICE
CERTIFICATE OF CORRECTION

Patent No. 3,311,628                                                  March 28, 1967

Richard A. Partyka

It is hereby certified that error appears in the above numbered patent requiring correction and that the said Letters Patent should read as corrected below.

Column 5, line 62, for "beings" read -- begins --; column 7 line 28, for "While" read -- The --; column 10, line 29, for "1503" read -- 15.03 --; column 11, line 22, for (b 2-" read -- (b) 2- --; line 40, for "methylacetamine" read -- methylacetamide --; line 45, for "ethylthio-4,7-dimethly-6-" read -- ethylthio-4,7-dimethyl-6- --; column 16, after line 29, insert the following:

References Cited by Applicant

UNITED STATES PATENTS 3,037,980                      6/1962                  Hitchings, et al

FOREIGN PATENTS 812,366                       4/1959                  Great Britain
980,515                       1/1965                  Great Britain
981,458                       1/1965                  Great Britain

OTHER REFERENCES

P. Nesbitt and P. Sykes, J. Chem. Soc., 3057-3062 (1954).
R. A. West and L. Beauchamp, J. Org. Chem. 26, 3809-3812 (1961).
R. A. West, J. Org. Chem. 26, 4959-4961 (1961).

Signed and sealed this 14th day of November 1967.

(SEAL)
Attest:

EDWARD M. FLETCHER, JR.                            EDWARD J. BRENNER
Attesting Officer                                        Commissioner of Patents